Nov. 17, 1953
C. I. WILLIAMS
2,659,125
CLAMP BRACKET
Filed June 22, 1950
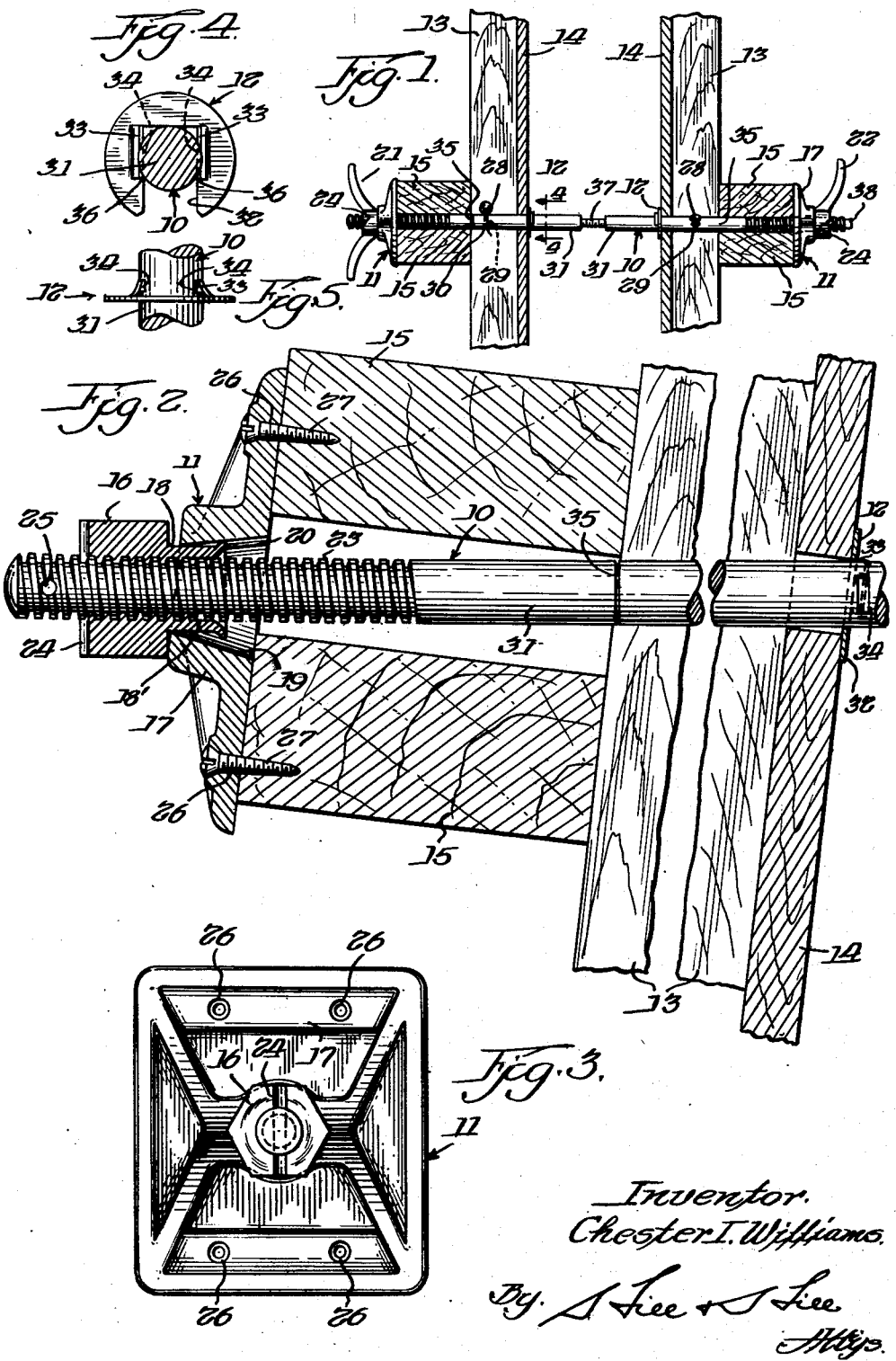
Inventor.
Chester I. Williams
By Lee & Lee
Attys.

Patented Nov. 17, 1953

2,659,125

UNITED STATES PATENT OFFICE 2,659,125

CLAMP BRACKET

Chester I. Williams, Grand Rapids, Mich.

Application June 22, 1950, Serial No. 169,731

3 Claims. (Cl. 25—131)

This invention relates to concrete forms and more particularly it relates to an improved device or form tie rod for securing the opposite side walls of a form together in a predetermined fixed relation. The invention is directed to an improvement in a clamp bracket and waler rod or she-bolt construction over that as disclosed and claimed in my U. S. Patent No. 2,190,748, granted February 20, 1940, for a Securing Device for Concrete Forms.

Prior to my invention, single casting nut units, which were necessarily shaped as round washer-like castings for rotation against the waler, were used. It is difficult to turn this type of nut in which metal rotates on wood under the normal high pressure that is placed upon the tie rods in concrete form work.

It is therefore a principal object of the invention to provide an improved clamp bracket overcoming the disadvantages of the prior art constructions.

Another object of the invention is to provide an improved clamp bracket which permits the turning of metal on metal, and reduces the friction normally encountered in earlier washer-like castings.

Another object of the invention is to provide an improved clamp bracket which may be used on any standard form of threaded she-bolt or waler rod construction.

Still another object of the invention is to provide a clamp bracket construction also adapted for use on waler rods or she-bolts which pull out of the concrete or disconnect back from the surface of the concrete.

Another object of the invention is to provide an improved clamp bracket for use with a she-bolt clamp which may be used with the nail in the stud, external spacing or with an internal spacer such as cones or washers bearing against the face of the form.

Still another object of the invention is the provision of improved fastening devices which are adapted to secure oppositely disposed form members together by means operable from the outside of the forms.

Another object of the invention is the provision of improved fastening devices so that oppositely positioned concrete form members may be spaced in their operative position by manipulation of the devices from the outside of the form.

The invention also has among its objects, the production of improved fastening devices of the kind described which are simple in construction, reliable, durable, economical, inexpensive, easily installed and satisfactory for its purpose.

In order to accomplish the various objects of the invention, I have provided an improved fastening device in which the adjustable or floating nut and clamping bracket therefor, are combined as one unit in which the nut may move relative to the bracket in attaching and detaching the combined nut and clamping bracket to the waler rod or she-bolt. The nut is provided with an expanded collar which extends into the bracket and when flared, holds the nut in its relative position with respect to the clamping bracket. The nut is free for rotating purposes and is flexibly mounted to the extent that the bracket may be moved to slight angles in any direction from its position, perpendicular to the axis of the nut. This is an important feature of the invention since it has an advantage in general use as occasionally the forms have a slight batter, or the clamps may be placed through the forms at a slight angle. In either of the cases, the bracket casting would set flush with the waler.

Many other objects and advantages of the construction herein shown and described will be obvious to those skilled in the art from the disclosure herein given.

To this end, my invention consists in the novel construction, arrangement and combination of parts herein shown and described and more particularly pointed out in the claims.

Referring now to the accompanying drawing forming part of the specification:

Fig. 1 illustrates a view in elevation taken through a vertical concrete form, partly in section, illustrating the use of the improved clamp bracket and waler rod of my invention;

Fig. 2 is an enlarged view in elevation, partly in section, of the improved clamp bracket and waler rod construction of Fig. 1 as applied to a slightly battered form construction;

Fig. 3 is an end view of the improved clamp bracket of my invention;

Fig. 4 is a view taken along line 4—4, looking in the direction of the arrows, illustrating an improved stud lock or washer affixed to the waler rod; and Fig. 5 is a view in elevation of the stud lock of Fig. 4.

Referring now more particularly to the drawing, an improved waler rod, she-bolt construction, form tie rod or fastening device 10, including an improved form of clamping bracket 11, and spacer or washer 12 is shown affixed to studs 13 of a conventional concrete form construction 14. As used in the claims, form tie rod may be considered as a generic term to waler rod, she-bolt construction, or other form of fastening device. The concrete form construction is conventionally formed by a plurality of oppositely positioned form members, the boards of each form being connected by nails or the like with the exteriorly vertically extending studs 13 and the studs being connected by longitudinally extending waler members 15.

The forms may be of any desired length and height, and the oppositely positioned form members are adapted to be dismantled and used repeatedly for pouring concrete walls of the same or different thicknesses, and the forms may be used either for the construction of vertical or battered walls. The form members are fastened together by a plurality of the improved fastening devices 10 similar to that shown in the drawing, the devices being suitably spaced vertically and longitudinally to provide requisite form rigidity.

Referring to Figs. 1, 2, and 3, the principal feature of my improved clamping bracket 11 is that an adjustable nut 16 and a clamp or clamping bracket 17 are combined as one unit. The nut which may be hex-shaped is formed with a cylindrically-shaped collar 18 which extends into a tapered or conical-shaped opening 19 of the bracket 17. When flared as at 20 with a suitable tool for assembly upon the bracket, the expanded collar holds the floating nut 16 in its relative position on the bracket. The flared collar 18 and tapered opening 19 provide a flexible connection which permits of relative axial movement of the nut and bracket, and also provides slight angular movement to permit the forms to be erected at a slight batter, or the waler rods 10 to be inserted at a slight angle through the forms when necessary. The floating nut 16 is provided with countersunk portion 18′, Fig. 2, which eases the operation of threading the nut onto the waler rod 31 and prevents cross threading. The nut is therefore free to rotate and is flexible or floating so that the bracket may be moved to slight angles in any direction from its position, perpendicular to the axes of the nut, as illustrated in the battered form construction of Fig. 2. In either of the cases, when the forms are constructed with a slight batter or the waler rods are inserted at a slight angle, the bracket 17 would set flush with the waler members.

The nut 16 may be formed with a hex-shaped head to be actuated with a wrench, or formed as a wing nut 21, or as a conventional tail nut 22, as shown in Fig. 1, but including the improved feature of the flared collar for attaching to the bracket, as described above. It is preferred to form the nuts 16, 21, and 22 as malleable castings, however, they may be formed from any suitable material, either cast or forged, to give the requisite strength for whatever purpose they are used. It is also preferred that the nuts shall be tapped to receive the conventional 8 pitch acme thread 23 of the waler rod, as shown in Figs. 1 and 2. The improved locking nuts 16, 21, and 22 may be provided with a groove 24 or castellated, Figs. 1, 2, and 3, complemental to the drilled hole 25 for the reception of a nail for the purpose which will be later described.

The combined adjustable nut and bracket are thus freely operative as one unit and have the advantage over the conventional nut units which are shaped as washer-like castings for rotation against the waler. With the conventional construction, it is difficult to turn metal upon wood under the normal high pressure that is had in concrete form work. However, with this improved adjustable nut and bracket, metal turns on metal and reduces the friction over the earlier devices. This improved construction may be used with any standard threaded form of waler rod or she-bolt construction. It may also be used with other forms of clamps where the rods pull out of the concrete or disconnect back from the surface of the concrete, as illustrated in the construction of Fig. 1.

It is preferred to form the bracket casting or forging square-shaped as shown in Fig. 3, or rectangular since it does not have to be turned on the wood waler construction 15. Although it may be formed circular in shape, or other conventional geometric form, the rectangular or square shape is preferred as these shapes are preferred since for the same number of patterns on a molding pattern or pattern plate, more surface area can be had on the resultant casting. This greater bearing surface is desirable in the use of the clamp. Nail or screw holes 26 permit the fastening of the combined adjusting nut and bracket 11 to the waler members 15 with screws 27, Fig. 2. If a rectangular-shaped bracket is used, it may be fastened to the waler members in either direction, for example, with the short axis vertical, and the long axis horizontal or reversed, depending upon the shape and arrangement of the waler members. The fastening of the bracket 17 to the waler members 15 is also advantageous, in that the clamp may be unscrewed or detached from the concrete and left in position for re-use.

The combined adjustable nut and clamp bracket is also adapted to be used with the nail in the stud as shown in Fig. 1, with a double headed nail 28 driven into the stud through a hole 29 in the waler rod 10. The waler rod may also be provided with a cotter-key 30 mounted in the hole 29 and the rod affixed to stud 13 by a double-headed nail 28, as shown in the left hand side of the form construction of Fig. 1. The construction of the combined nut and bracket is equally adapted for use with a she-bolt clamp in external spacing or with an internal spacer such as cones or washers bearing against the face of the form.

Referring to Fig. 1, I have also provided in the improved waler rod construction or fastening device 10, the improved spacer or washer construction 12 for correctly locating the inner end of the detachable portion 31 of the she-bolt 10 within the form. The washer 12 which bears against the sheathing of the form also serves to hold the sheathing against the stud. Referring to Figs. 1, 2, 4, and 5, the washer or spacer is horseshoe or U-shaped in form and formed preferably from thin gauged sheet steel and heat treated. The washer is preferably round and the center thereof is provided with a rectangular-shaped notch 32 having lug portions 33 struck up as shown in Figs. 4 and 5 from the notch 32. In the assembled position on the waler rods 31, the lugs 33 engage slots 34 diametrically spaced on the rod and are flexibly mounted thereon to accommodate any slight angularity of the rods when mounted upon the form. The distance between the washer 12 and the stud mark 35 is the conventional spacing of the stud and sheathing. Additional stud marking may be provided, if desired, for different stud and sheathing dimensions as a gauge for the proper erection of the forms. The spacer or washer 12 is simply assembled on the waler rod 31 by inserting the edges of the notch 32 in the slots 34, and then forcing the lugs 33 into the slots 34. Since in this position the corners 36 engage the surface of the rod, the washer is locked upon the rod. However, when the concrete is poured and the initial set has taken place, the outer rods or waler rods may be detached after the double-headed nails 28 have been detached from the studs by rotating the waler rods off the inner rods. The outer rods or waler rods may be withdrawn from the concrete by turning the nuts 16, 21, and 22 in the preferred direction and by screwing the rods out. The washer releases after one-quarter turn, and later drops off as the waler rod is withdrawn. When the forms are re-used, other washers 12 may be re-assembled in the manner described above, and the washers are also adapted for use with conventional cone-shaped spacers (not shown).

In constructing a concrete form using the improved waler rod construction, including the combined adjusting nut and clamp bracket 11 and stud lock 12, the waler members 15 are affixed to the studs in any suitable manner. Each securing device or waler rod assembly 10 is then erected in place as shown. The waler rods 31, which are of conventional construction, are projected through aligned holes in the forms 14, and affixed to an intermediate rod or she-rod 37. The stud locks 12, which are assembled in position on the waler rods 31, serve to correctly space the sheathing 14 of the forms. The waler rods may be temporarily supported by the double-headed nails 28, as previously described, being driven through the holes 29 in the waler rods, also to hold the form members in fixed, spaced-apart relation. The nails prevent such rotation of the members 31 as might occur when the clamping brackets are adjusted. The brackets 17 are suitably affixed to the waler members 15, after which the waler rods 10 are properly adjusted. The flexible adjusting nut and clamp bracket 11 permit any slight angularity necessary for the erection of the she-bolts. It is to be understood that the nails or other securing devices are removed before attempting to rotate and release the members 31. The stud marks 35 indicate the proper depth of the rods within the form together with the stud locks, spacers, or washers 12. Spacer means and means flexibly mounted on each waler rod contiguous to the inner face of the sheathing may be considered as a generic term for spacers, washers, stud locks, and the like members 12.

The forms constructed in this manner may be raised and relocated at will, as is well understood in the art. When it is necessary to remove the forms, the removal of the outer rod 31 of the clamp 10 is accomplished by running the nut 16, 21, or 22 back to the drill hole 25 of the waler rod 31 upon the securing means 27 being removed from the clamp bracket 17. A nail or pin is inserted which locks the nut and the rod together through the groove 24. The rod is first rotated approximately one-quarter turn to detach the spacer or washer 12 from the slots 34 in the waler rod. Upon further rotation of the nut, the outer rod 31 is then disconnected from the inner rod 37 which may be suitably serrated to prevent rotation within the concrete. This rotation may also be accomplished by squaring the end of the waler rod, as indicated at 38, Fig. 1. The dismantled forms may then be re-assembled wherever desired in the reverse order.

It is thus obvious that there has been disclosed a simple and inexpensive form of waler rod construction including an improved combined adjusting nut and clamp bracket together with a stud lock which may be readily assembled and disassembled in the construction of concrete forms. Furthermore, the constructions may be adapted for waler rods already in use in the field which may have conventional U. S. threads, acme 4, 5, or 8 pitch thread, or other suitable thread. The stud locks may be applied by suitably grooving rods already in use.

Furthermore, the improved securing devices of this invention work equally well on vertical or battered walls. The waler rods are easily demounted, and no wrecking is necessary, thus permitting greater salvage of lumber.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. The combination with a concrete form construction including sheathing and studding, and waler members adapted to be positioned transversely with respect to the studding on opposite sides of the concrete form, of a clamping device including detachable waler rods having oppositely spaced grooves contiguous to the inner face of the sheathing and adapted to extend between the waler members and through the sheathing on opposite sides of the concrete form for securing the opposite sides of the concrete form together, said clamping device comprising an adjusting nut comprising a cylindrical shaped collar having an annular countersunk portion and a clamping bracket having a conically shaped opening, said annular countersunk portion deformed outwardly into the opening flexibly connecting them together for each waler rod of the clamping device, disk-like spacer means provided with an opening larger than the diameter of said waler rod and including flexible lugs located in said opening and converging outwardly from the plane of the disk-like spacer means and of a shape complemental to the shape of the grooves in the rod, and said disk-like spacer means flexibly mounted by the aforesaid lugs in the grooves formed on each waler rod contiguous to the inner face of the sheathing on opposite sides of the concrete form, whereby said disk-like spacer means is adapted to be detached from the grooves in the waler rod by a slight turn thereof after concrete poured within the concrete form has been allowed to set.

2. The combination with a clamping device for a concrete form including a form tie rod, externally threaded upon one end and having oppositely formed grooves intermediate the ends of the form tie rod, of a combined adjusting nut and clamping bracket flexibly connected together, said adjusting nut comprising a cylindrically shaped collar and provided with an annular portion deformed outwardly into a conically shaped opening in the clamping bracket securing and flexibly connecting them together, said adjusting nut adapted for engagement with the form tie rod, disk-like spacer means provided with an opening larger than the diameter of said form tie rod and including flexible lugs located at said opening and converging outwardly from the plane of the disk-like spacer means and of a shape complemental to the shape of the grooves in the rod, and said disk-like spacer means flexibly mounted upon the form tie rod, whereby said disk-like spacer means is adapted to be detached from the form tie rod upon a partial rotation of the tie rod when the clamping device is cast within concrete within the concrete form.

3. A combined adjusting and floating nut and clamping bracket adapted to be adjustably mounted on a form tie rod and affixed to whaler members, said nut having an elongated cylindrical collar portion, said bracket comprising a boss extending centrally thereof and a substantially flat flange surrounding the boss, a smooth continuous conically shaped opening extending through the boss, perforations through said flange for the passing of fastening elements therethrough, the major extent of the outside diameter of said collar portion being slightly smaller than the diameter of the small end of said opening, said collar portion entering said opening through the small end thereof and flared annularly outwardly within the opening to flexibly affix the nut to the clamping bracket for axial, rotary and angular movement of the nut relative to the bracket.

CHESTER I. WILLIAMS.

References Cited in the file of this patent

UNITED STATES PATENTS

| Number | Name | Date |
|---|---|---|
| 1,293,391 | Ewing | Feb. 4, 1919 |
| 1,851,339 | Williams | Mar. 29, 1932 |
| 2,049,916 | Lingle | Aug. 6, 1936 |
| 2,126,251 | Gaetke | Aug. 9, 1938 |
| 2,168,714 | Neptune | Aug. 8, 1939 |
| 2,270,448 | Juhl | Jan. 20, 1942 |
| 2,365,785 | Tinnerman | Dec. 26, 1944 |
| 2,574,107 | Joy | Nov. 6, 1951 |